(12) United States Patent
Janson et al.

(10) Patent No.: US 8,475,317 B2
(45) Date of Patent: Jul. 2, 2013

(54) VEHICLE ACCESSORY DRIVE SYSTEM

(75) Inventors: David A. Janson, Plymouth, MI (US);
John E. Brevick, Livonia, MI (US);
Reid A. Baldwin, Howell, MI (US)

(73) Assignee: Ford Global Technologies, LLC,
Dearborn, MI (US)

( * ) Notice: Subject to any disclaimer, the term of this patent is extended or adjusted under 35 U.S.C. 154(b) by 187 days.

(21) Appl. No.: 13/196,930

(22) Filed: Aug. 3, 2011

(65) Prior Publication Data

US 2013/0035193 A1  Feb. 7, 2013

(51) Int. Cl.
*F16H 37/02* (2006.01)

(52) U.S. Cl.
USPC .......................................... 475/210

(58) Field of Classification Search
USPC .................................. 475/210, 219
See application file for complete search history.

(56) References Cited

U.S. PATENT DOCUMENTS

| | | | |
|---|---|---|---|
| 4,257,281 A * | 3/1981 | Bunger | 74/6 |
| 5,418,400 A | 5/1995 | Stockton | |
| 5,429,082 A | 7/1995 | Wichelhaus | |
| 5,966,985 A * | 10/1999 | Shuto et al. | 74/7 C |
| 6,537,175 B1 * | 3/2003 | Blood | 477/44 |
| 6,554,113 B2 | 4/2003 | Li et al. | |
| 6,609,505 B2 | 8/2003 | Janson | |
| 6,631,702 B2 | 10/2003 | Tonnqvist et al. | |
| 6,631,703 B2 | 10/2003 | Tonnqvist et al. | |
| 6,848,552 B2 | 2/2005 | Miller | |
| 7,237,447 B2 | 7/2007 | Cilibraise | |
| 7,467,697 B2 | 12/2008 | Elie et al. | |
| 7,726,275 B2 | 6/2010 | Deniston et al. | |
| 8,328,673 B2 * | 12/2012 | Smith et al. | 475/5 |
| 2009/0298646 A1 | 12/2009 | Parsons | |

FOREIGN PATENT DOCUMENTS

| | | |
|---|---|---|
| FR | 2826694 A1 | 1/2003 |
| JP | 63248929 A | 10/1988 |

* cited by examiner

*Primary Examiner* — Edwin A Young
(74) *Attorney, Agent, or Firm* — James Dottavio; MacMillian, Sobanski & Todd, LLC

(57) ABSTRACT

A vehicle drive system includes a first power path wherein an engine drives an accessory and a starter-alternator at relatively low speed, a second power path wherein the engine drives the accessory and a starter-alternator at relatively high speed, a third power path wherein the starter-alternator drives the accessory while the engine is off, and a fourth power path wherein the starter-alternator cranks the engine before an engine restart.

22 Claims, 4 Drawing Sheets

|  | 30 | 32 | OWC1 24 | OWC2 28 | OWC3 26 |
|---|---|---|---|---|---|
| Engine Drives Acc. – Low |  |  | X |  | (X) |
| Engine Drives Acc. – High | X |  |  |  | X |
| Motor Drives Acc. |  | X |  | X |  |
| Motor Starts Engine | X |  |  | X |  |

Fig. 3

| | \multicolumn{6}{c}{Relative Speed} |
|---|---|---|---|---|---|---|
|  | S1 44 | C1 48 | R1 46 | S2 54 | C2 58 | R2 56 |
| Engine Drives Acc. – Low | 1.000 | 1.000 | 1.000 | 1.000 | 0.333 | 0.000 |
| Engine Drives Acc. – High | 0.000 | 1.000 | 1.500 | 1.500 | 0.500 | 0.000 |
| Motor Drives Acc. | −0.667 | 0.000 | 0.333 | 1.000 | 0.333 | 0.000 |
| Motor Starts Engine | 0.000 | 0.222 | 0.333 | 1.000 | 0.333 | 0.000 |
| | \multicolumn{6}{c}{Relative Torques} |
|  | S1 | C1 | R1 | S2 | C2 | R2 |
| Engine Drives Acc. – Low | 0.000 | 0.000 | 0.000 | 0.000 | 0.000 | 0.000 |
| Engine Drives Acc. – High | −0.333 | 1.000 | −0.667 | 0.000 | 0.000 | 0.000 |
| Motor Drives Acc. | 0.000 | 0.000 | 0.000 | 0.000 | 0.000 | 0.000 |
| Motor Starts Engine | 1.500 | −4.500 | 3.000 | 1.000 | −3.000 | 2.000 |

Fig. 4

VEHICLE ACCESSORY DRIVE SYSTEM

BACKGROUND OF THE INVENTION

1. Field of the Invention

This invention relates generally to a system that transmits power to motor vehicle accessories from an engine and a starter-alternator, and uses the starter-alternator to crank the engine before it restarts.

2. Description of the Prior Art

Sources of automobile accessory power can include an engine, battery, or other prime mover source of energy. High-powered batteries in hybrid and all-electrical vehicles are shifting the balance of technologies further in the direction of electrically-powered accessories.

An engine has one or more devices for converting energy it produces into a usable form, electricity connection through an alternator, hydraulic connections from a pump or engine system. Modern vehicles run most accessories on electrical power. Electrical and hybrid vehicles may use a larger proportion of energy for accessories, due to reduced inefficiencies in the drive train, especially the elimination of engine idling.

Some automobile accessories are connected directly to the engine through gearing or belts. These usually require large amounts of power. The air conditioning compressor has been a familiar example.

A need exists in the industry for an automobile accessory drive that is efficient in transmitting power to the accessories and able provide an engaged starter system for an engine restart system.

SUMMARY OF THE INVENTION

A vehicle drive system includes a first power path wherein an engine drives an accessory and a starter-alternator at relatively low speed, a second power path wherein the engine drives the accessory and a starter-alternator at relatively high speed, a third power path wherein the starter-alternator drives the accessory while the engine is off, and a fourth power path wherein the starter-alternator cranks the engine before an engine restart.

A gearbox mounted on the engine crank provides three speed ratios, two ratios to optimize the accessory drive and a third ratio for engine starting.

The multi-speed accessory drive system can improve fuel economy by running the accessories more efficiently and allowing downsizing of components. Using the starter motor to run the accessories while the engine is off allows a greater use of a strategy in which the engine is stopped when the vehicle is stopped.

The gearbox mounted to the crank allows declutching the engine so that the alternator-motor can run the accessories with the engine off. The gearbox also allows optimization of accessory operating speeds and provides sufficient torque for engine starting without requiring high belt tension or high motor torque.

A single friction element provides clutching of the engine and a change in accessory drive speed ratio.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 3 is a chart showing the operating states of the brake, clutch and overrunning clutches for each drive condition;

FIG. 4 shows the relative speed and torque of the components of the planetary gearsets of the accessory drive system for each of the drive conditions.

DESCRIPTION OF THE PREFERRED EMBODIMENT

Figure 1:
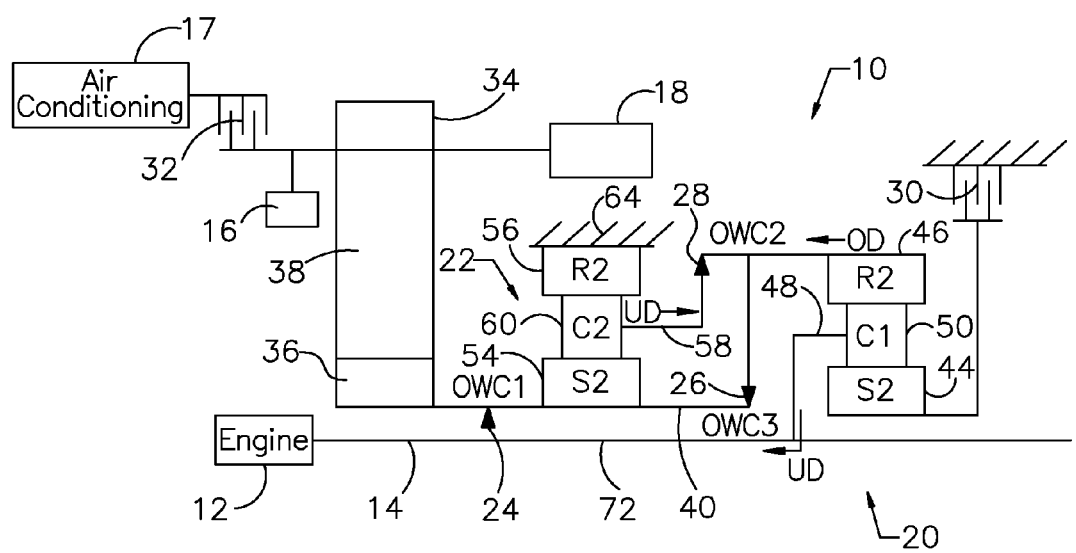
FIG. 1 is a schematic diagram of an accessory drive system for a motor vehicle.

Referring now to the drawings, the accessory drive system 10 shown in FIG. 1 includes a power source 12, such as an engine; engine shaft 14; accessories 16; an air conditioning system compressor 17; a starter-alternator 18 able to operate in reversible rotary directions; two planetary gearsets 20, 22; three overrunning clutches (OWC) 24, 26, 28; friction brake 30; friction clutch 32; pulley 34; drive belt 38 engaged with the pulley; and a sleeve shaft 40.

Although FIG. 1 illustrates specifically only air conditioning system compressor 17 and starter-alternator 18 as engaged by drive belt 38, other accessories 16 that may be driveably connected to drive belt 38 include, but are not limited to an engine coolant pump, power steering pump, etc.

Engine shaft 14 is driveably connected through a shaft 72 to planetary gearset 20, which includes a sun gear 44, connected to clutch 30; ring gear 46, connected to OWCs 26, 28; carrier 48, connected to shaft 72; and planet pinions 50, supported on carrier 48 and meshing with ring gear 46 and sun gear 44.

Shaft 40 is driveably connected to planetary gearset 22, which includes a sun gear 54, connected to shaft 40, OWC 24 and pulley 34; ring gear 56, fixed against rotation; carrier 58, connected to ring gear 46 through OWC 28; and planet pinions 60, supported on carrier 58 and meshing with ring gear 56 and sun gear 54.

Figure 2:
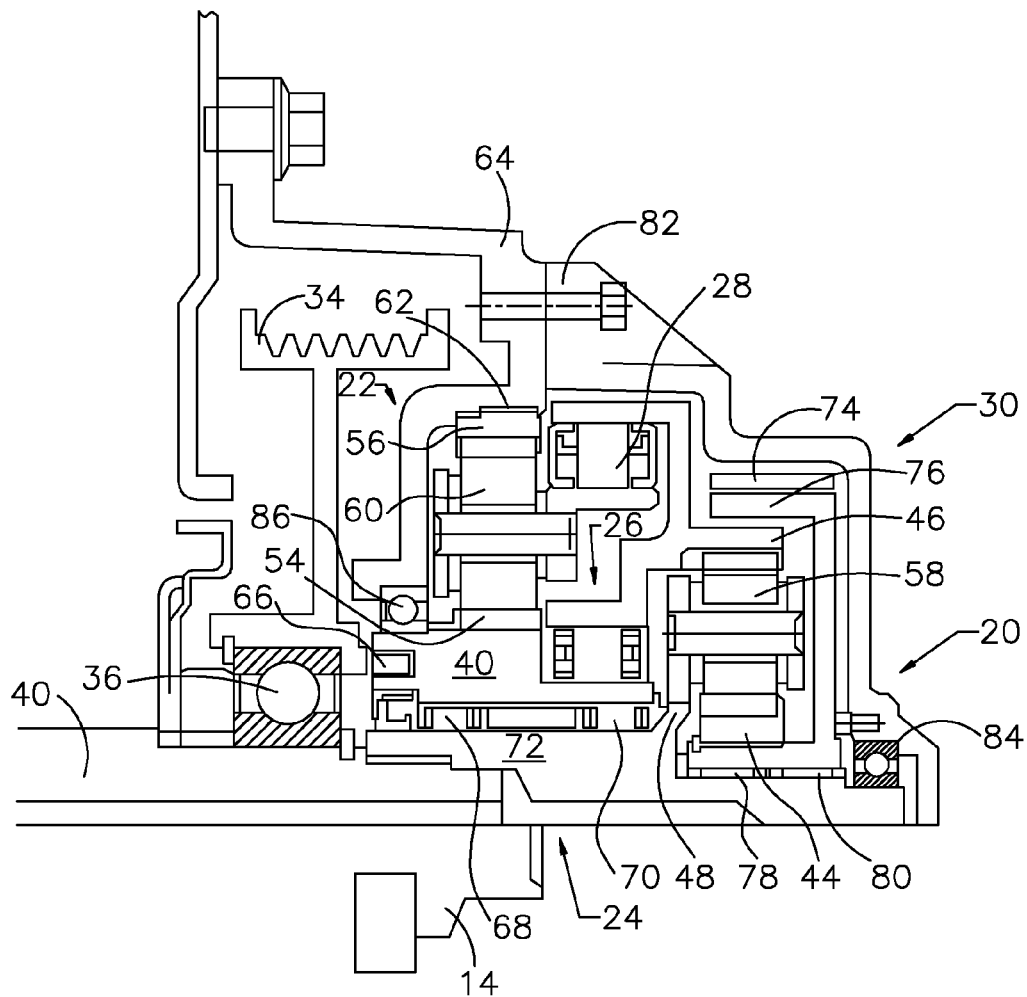
FIG. 2 is a cross section of the drive system assembly of FIG. 1.

FIG. 2 shows that the bearing 36 supports pulley 34 on shaft 40, which is a sleeve shaft surrounding engine shaft 14. Ring gear 56 is secured by a spline connection 62 to a housing 64, which is fixed against rotation. Sun gear 54 (i) is secured by a spline connection 66 to pulley 34, (ii) forms the outer race of OWC 24, and (iii) is supported by bearings 68, 70 on an input shaft 72, which is formed integrally with carrier 48.

Friction brake 30 may include a brake band 74, which alternately engages and releases a brake drum 76, which secured by a spline connection to sun gear 44. Brake drum 76 is supported by needle bearings 78, 80 on input shaft 72.

A housing 82, secured to housing 64, is supported by a bearing 84 on input shaft 72. Sun gear 54 is supported by a bearing 86 on housing 64.

FIG. 3 is a chart showing the engaged and disengaged state of brake 30 and clutch 32 and driving and overrunning state of OWCs 24, 26, 26 for each of four drive conditions.

In operation during a first drive condition when brake 30 is disengaged, engine 12 drives the accessories 16 and starter-alternator 18 in a forward rotary direction at relatively low speed through a power path that includes engine shaft 14, OWC1 24, drive belt 38, and pulley 34. During operation in the first drive condition, accessory drive system 10 produces a direct drive condition, in which the accessories 16 and starter-alternator 18 are driven at engine speed.

During a second drive condition, i.e., when brake 30 is engaged and carrier 48 of gearset 20 driven by the engine 12, ring gear 46 is overdriven preferably at about 1.5 times the speed of the engine. The engine drives the accessories 16 and starter-alternator 18 in a forward rotary direction at relatively high speed. Power is transmitted from engine 12 through a power path that includes engine shaft 14, input shaft 72, carrier 48, ring gear 46, OWC3 26, shaft 40, drive belt 38, and pulley 34. One-way clutch 26 transmits power to starter-alternator 18 through shaft 40, drive belt 38 and pulley 34. Power can be transmitted also through clutch 32 to the air conditioning system compressor 17 and through any other clutch located in a drive path between pulley 34 and another accessory.

During a third drive condition when brake 30 is disengaged, starter alternator 18 operating as a motor drives accessories 16 directly and the air conditioning system compressor 17, provided clutch 32 is engaged. Preferably, the speed of starter-alternator 18 is equal to the speed of the accessories 16.

During a fourth second drive condition when brake 30 is engaged, clutch 32 is disengaged and the engine is off, starter alternator 18 operating as a motor cranks engine 12 before the engine restarts through a drive path that includes pulley 34, drive belt 38, shaft 40, sun gear 54 carrier 58, OWC2 28, ring gear 46, carrier 48, input shaft 72, and engine shaft 14. With ring gear 56 held against rotation and sun gear 54 of gearset 22 driven by starter-alternator 18 through drive belt 38, carrier 58 is underdriven at about 0.333 times the speed of the starter-alternator 18. One-way clutch 28 transmits power from carrier 48 to ring gear 46. With sun gear 44 held against rotation, carrier 48 and engine 12 rotate at about 0.222 times the speed of starter-alternator 18.

Figure 5:
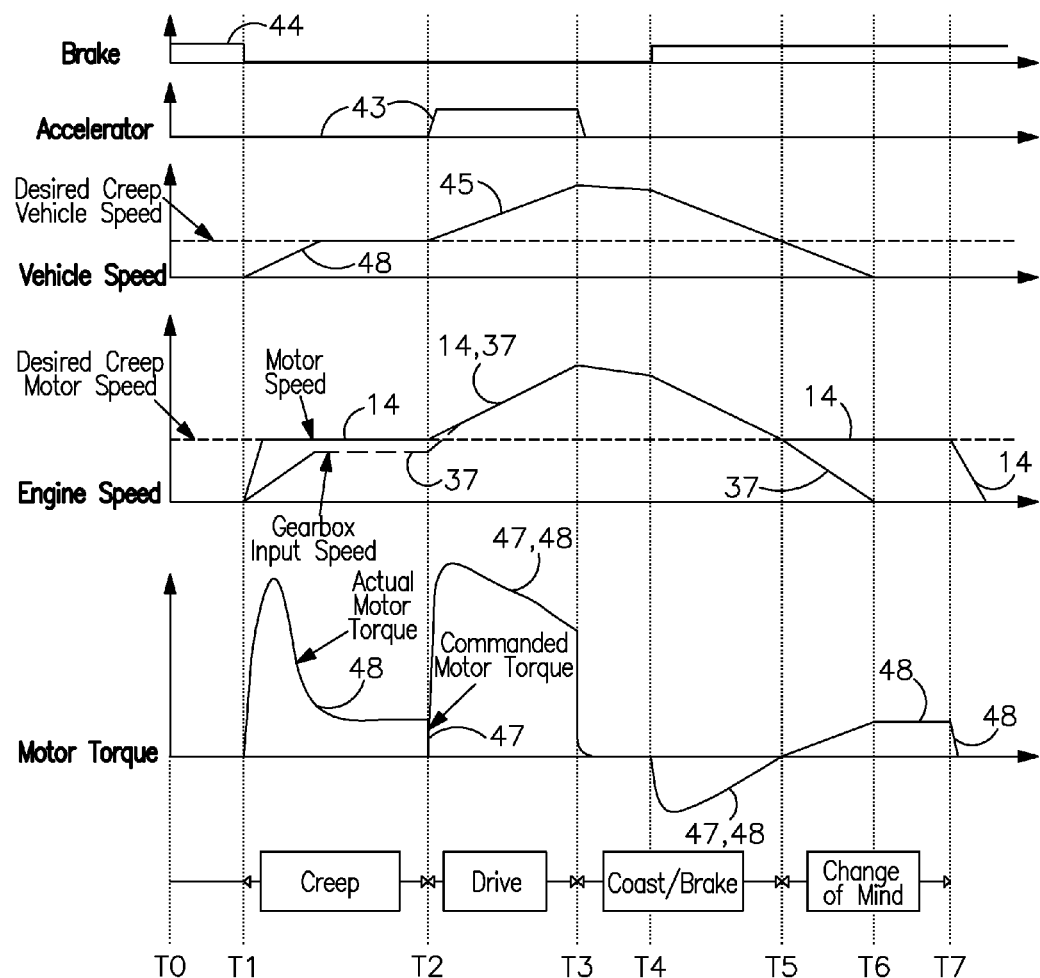
FIG. 5 shows the relative speed and torque of the brakes, clutches, starter-alternator, engine and accessories of the accessory drive system for each of the drive conditions.

A preferred beta ratio, i.e., the pitch diameter of the ring gear divided by the pitch diameter of the sun gear, for gearsets 20, 22 is 2.0. FIG. 4 shows the relative speed and torque of the components of the planetary gearsets of the accessory drive system for each of the drive conditions, when the beta ratio of gearsets 20, 22 is 2.0. FIG. 5 shows the relative speed and torque of the brakes, clutches; starter-alternator, engine and accessories of the accessory drive system for each of the drive conditions, when the beta ratio of gearsets 20, 22 is 2.0.

In accordance with the provisions of the patent statutes, the preferred embodiment has been described. However, it should be noted that the alternate embodiments can be practiced otherwise than as specifically illustrated and described.

The invention claimed is:

1. A vehicle accessory drive system, comprising:
    a first power path wherein an engine drives an accessory and a starter-alternator at relatively low speed;
    a second power path wherein the engine drives the accessory and the starter-alternator at relatively high speed;
    a third power path wherein the starter-alternator drives the accessory while the engine is off;
    a fourth power path wherein the starter-alternator cranks the engine before an engine restart.

2. The drive system of claim 1, wherein the first power path includes an engine shaft, a one-way clutch secured to the engine shaft, a drive belt driveably connected to an output of the one-way clutch, and a pulley engaged by the drive belt and driveably connected to the accessory.

3. The drive system of claim 2, further comprising a clutch alternately opening and closing a drive connection between an air conditioning system compressor and the pulley.

4. The drive system of claim 1, wherein the second power path includes an engine shaft, a planetary gearset including an input connected to the engine shaft and an output overdriven relative to a speed of the engine shaft, a second one-way clutch connected to the output, a drive belt driveably connected to an output of the one-way clutch, and a pulley engaged by the drive belt and driveably connected to the accessory.

5. The drive system of claim 4, wherein the planetary gearset further includes:
    an input carrier connected to the engine shaft, the carrier supporting pinions in rotation;
    an output ring gear connected to the second one-way clutch and meshing with the pinions;
    a sun gear meshing with the pinions and alternately held against rotation and released to rotate.

6. The drive system of claim 5, further comprising a friction brake alternately opening and closing a drive connection between the sun gear and a non-rotating component.

7. The drive system of claim 1, wherein the third power path includes the starter-alternator driveably connected to the accessory.

8. The drive system of claim 7, further comprising a clutch alternately opening and closing a drive connection between an air conditioning system compressor and the starter-alternator.

9. The drive system of claim 1, wherein the fourth power path includes:
    the starter alternator;
    a pulley driveably connected to the starter-alternator;
    a drive belt engaged with the pulley;
    a second planetary gearset including a second input shaft driveably connected to the drive belt, and a second output underdriven relative to a speed of the second input;
    a third one-way clutch connected to the second output;
    a planetary gearset including an input driveably connected to an output of the third one-way clutch, and an output underdriven relative to a speed of the input and driveably connected to an engine shaft.

10. The drive system of claim 9, wherein:
    the planetary gearset further includes an output carrier connected to the engine shaft and supporting pinions in rotation, an input ring gear connected to the output of the third one-way clutch and meshing with the pinions, and a sun gear meshing with the pinions and alternately held against rotation and released to rotate.

11. The drive system of claim 10, further comprising a friction brake alternately opening and closing a drive connection between the sun gear and a non-rotating component.

12. The drive system of claim 9, wherein:
    the second planetary gearset further includes an output carrier connected to the third one-way clutch and supporting pinions in rotation, a ring gear meshing with the pinions and held against rotation, and an input sun gear driveably connected to the drive belt.

13. A vehicle accessory drive system, comprising:
    a first power path wherein an engine drives an accessory at relatively low speed;
    a second power path wherein the engine drives the accessory at relatively high speed;
    a third power path wherein a starter-alternator drives the accessory while the engine is off;

a fourth power path wherein the starter-alternator cranks the engine slower than a speed of the starter-alternator with greater torque than starter-alternator torque.

14. The drive system of claim 13, wherein the first power path includes an engine shaft, a one-way clutch secured to the engine shaft, a drive belt driveably connected to an output of the one-way clutch, and a pulley engaged by the drive belt and driveably connected to the accessory.

15. The drive system of claim 14, further comprising a clutch alternately opening and closing a drive connection between an air conditioning system compressor and the pulley.

16. The drive system of claim 14, wherein the second power path includes an engine shaft, a planetary gearset including an input connected to the engine shaft and an output overdriven relative to a speed of the engine shaft, a second one-way clutch connected to the output, a drive belt driveable connected to an output of the one-way clutch, and a pulley engaged by the drive belt and driveably connected to the accessory.

17. The drive system of claim 16, wherein the planetary gearset further includes:
- an input carrier connected to the engine shaft, the carrier supporting pinions in rotation;
- an output ring gear connected to the second one-way clutch and meshing with the pinions;
- a sun gear meshing with the pinions and alternately held against rotation and released to rotate;
- a friction brake alternately opening and closing a drive connection between the sun gear and a non-rotating component.

18. The drive system of claim 13, wherein the third power path includes the starter-alternator driveably connected to the accessory.

19. The drive system of claim 13, wherein the fourth power path includes:
- the starter alternator;
- a pulley driveably connected to the starter-alternator;
- a drive belt engaged with the pulley;
- a second planetary gearset including a second input shaft driveably connected to the drive belt, and a second output underdriven relative to a speed of the second input;
- a third one-way clutch connected to the second output;
- a planetary gearset including an input driveably connected to an output of the third one-way clutch, and an output underdriven relative to a speed of the input and driveably connected to an engine shaft.

20. The drive system of claim 19, wherein:
the planetary gearset further includes an output carrier connected to the engine shaft and supporting pinions in rotation, an input ring gear connected to the output of the third one-way clutch and meshing with the pinions, and a sun gear meshing with the pinions and alternately held against rotation and released to rotate.

21. The drive system of claim 20, further comprising a friction brake alternately opening and closing a drive connection between the sun gear and a non-rotating component.

22. The drive system of claim 19, wherein:
the second planetary gearset further includes an output carrier connected to the third one-way clutch and supporting pinions in rotation, a ring gear meshing with the pinions and held against rotation, and an input sun gear driveably connected to the drive belt.

* * * * *